UNITED STATES PATENT OFFICE.

WILLIAM JOHN WILLIAMS, OF CAMDEN, NEW JERSEY.

PHOSPHATIC FERTILIZER.

SPECIFICATION forming part of Letters Patent No. 395,532, dated January 1, 1889.

Application filed March 16, 1888. Serial No. 267,395. (No specimens.)

*To all whom it may concern:*

Be it known that I, WILLIAM JOHN WILLIAMS, a resident of Camden, Camden county, New Jersey, and a subject of the Queen of Great Britain and Ireland, have invented certain Improvements in the Manufacture of Fertilizers, of which the following is a specification.

My invention contemplates the utilization of wool waste, wool, hair, blood, tankage, and other suitable nitrogenous materials for the manufacture of fertilizers by proper treatment in combination with phosphates of alumina or iron, or both.

In carrying out my invention I first take the wool waste, wool, hair, blood, tankage, or other suitable nitrogenous matters and treat them with sulphuric acid, preferably "chamber acid," of about fifty degrees (50°) Baumé, although it may be concentrated as high as sixty degrees (60°) Baumé. The nitrogenous matters are rendered by this sulphuric acid treatment more soluble and available as plant-food and are held in a fluid condition, so that they can be more thoroughly and intimately mixed or incorporated with the other ingredients of the fertilizer. I then separately take the phosphate of alumina or phosphate of iron, or mixtures of the two phosphates, and after they have been calcined and finely pulverized they are mixed with water, whereby the mass, although not dissolved, is made sufficiently fluid to flow to the mixer, where the nitrogenous matters and sulphuric acid prepared as above described are thoroughly incorporated with the phosphates. Afterward the mixture is allowed to dry at a gentle steady heat not exceeding one hundred and eighty degrees (180°) Fahrenheit.

The quantity of water to be added to the phosphates should be sufficient to enable the mass to set on drying. I find that the minimum quantity required is about six to eight parts water to about twenty parts of phosphate of alumina and iron to obtain a dry hardened product from the mixture of the phosphates with the nitrogenous matters and sulphuric acid. A small excess of water is no disadvantage except that the mass then takes longer to harden and "set" in a dry and merchantable condition; but if too little water be present the mass can then only be dried by the appliance of so much heat that the phosphoric acid is rendered insoluble and of no value as a fertilizer.

While I do not desire to restrict myself to specific proportions of the different materials, I may mention the following as an example, which will give satisfactory results: Two thousand pounds (2,000 lbs.) of alumina and iron phosphates mixed with six to eight hundred pounds (600 to 800 lbs.) of water, making from two thousand six hundred to two thousand eight hundred pounds of phosphate in water. With this should be incorporated about three thousand six hundred or three thousand seven hundred pounds of nitrogenous matter and acid, composed of about sixteen hundred pounds of wool waste or other nitrogenous material in two thousand to two thousand one hundred pounds of acid. The phosphates are reckoned on a basis of forty-eight to fifty per cent. of phosphoric acid.

The quantity of acid and nitrogenous matter will vary according to the percentage of nitrogen in the wool or other material and the quantity of nitrogen required in the fertilizer.

I claim as my invention—

The herein-described mode of producing fertilizers, said mode consisting in, first, treating nitrogenous matters with sulphuric acid, separately mixing water with calcined phosphate of alumina or iron, or a mixture of the two, and then thoroughly incorporating the mixture of sulphuric acid and nitrogenous matter with the phosphate in the water.

In testimony whereof I have signed my name to this specification in the presence of two subscribing witnesses.

WILLIAM JOHN WILLIAMS.

Witnesses:
JOHN WILLIAM PRESTWICH,
LOUIS B. HUMPHREYS.